(12) United States Patent
Wild et al.

(10) Patent No.: US 11,658,541 B2
(45) Date of Patent: May 23, 2023

(54) UNENCLOSED ELECTRIC TRACTION MACHINE

(71) Applicant: TRAKTIONSSYSTEME AUSTRIA GMBH, Wiener Neudorf (AT)

(72) Inventors: Stefan Wild, Wiener Neudorf (AT); Philipp Samstag, Wiener Neudorf (AT)

(73) Assignee: TRAKTIONSSYSTEME AUSTRIA GMBH, Wiener Neudorf (AT)

( * ) Notice: Subject to any disclaimer, the term of this patent is extended or adjusted under 35 U.S.C. 154(b) by 37 days.

(21) Appl. No.: 17/312,199

(22) PCT Filed: Jun. 30, 2020

(86) PCT No.: PCT/EP2020/068354
§ 371 (c)(1),
(2) Date: Jun. 9, 2021

(87) PCT Pub. No.: WO2021/058152
PCT Pub. Date: Apr. 1, 2021

(65) Prior Publication Data
US 2022/0052577 A1    Feb. 17, 2022

(30) Foreign Application Priority Data

Sep. 27, 2019 (EP) .................................. 19200030

(51) Int. Cl.
*H02K 5/20* (2006.01)
*H02K 9/22* (2006.01)
(Continued)

(52) U.S. Cl.
CPC ................. *H02K 5/20* (2013.01); *H02K 5/15* (2013.01); *H02K 5/173* (2013.01); *H02K 5/203* (2021.01); *H02K 9/19* (2013.01); *H02K 9/227* (2021.01)

(58) Field of Classification Search
CPC ............... H02K 1/20; H02K 5/20; H02K 9/19
(Continued)

(56) References Cited

U.S. PATENT DOCUMENTS 5,744,880 A    4/1998  Kudoh et al.
11,283,330 B2 *  3/2022  Lin ........................ H02K 11/33
(Continued)

FOREIGN PATENT DOCUMENTS

CN      1937365 A      3/2007
EP      0 548 044 B1   5/1998
(Continued)

OTHER PUBLICATIONS

International Search Report in PCT/EP2020/068354, dated Sep. 2, 2020.
(Continued)

*Primary Examiner* — Ahmed Elnakib
*Assistant Examiner* — Minki Chang
(74) *Attorney, Agent, or Firm* — Collard & Roe, P.C.

(57) ABSTRACT

An unenclosed electric traction machine has a stator built up from a stator laminated core, and a rotor shaft with a rotor, mounted on the latter, built up from a rotor laminated core, wherein the stator laminated core is arranged between two outer pressing plates, and at least one bearing shield, which in each case has a bearing for the rotor shaft. Along a section of the periphery of the stator laminated core, and spaced apart from the stator laminated core, at least one cover, designed as a tension bar between the pressing plates, is arranged between the pressing plates so as to form at least one cooling box, with a base on the surface of the stator laminated core, wherein the at least one intermediate space between the base and the at least one cover of the cooling box is designed for the routing of a cooling fluid.

19 Claims, 5 Drawing Sheets

(51) Int. Cl.
      *H02K 5/15*         (2006.01)
      *H02K 5/173*      (2006.01)
      *H02K 9/19*        (2006.01)

(58) Field of Classification Search
      USPC .................................................... 310/54, 58
      See application file for complete search history.

(56)                       References Cited

U.S. PATENT DOCUMENTS 11,289,979 B2 *   3/2022   Mori ........................ H02K 3/28
  2003/0222519 A1    12/2003   Bostwick
  2018/0375393 A1 *  12/2018   Nakayama ............. H02K 5/203
  2019/0181790 A1 *   6/2019   Adam ................... H02P 29/032

FOREIGN PATENT DOCUMENTS

| EP | 1 515 417 A2 | 3/2005 |
| JP | H10-225060 A | 8/1998 |
| JP | 2005-333795 A | 12/2005 |

OTHER PUBLICATIONS

European Search Report in EP 19200030.5-1201, dated Mar. 18, 2020, with English translation of relevant parts.

\* cited by examiner

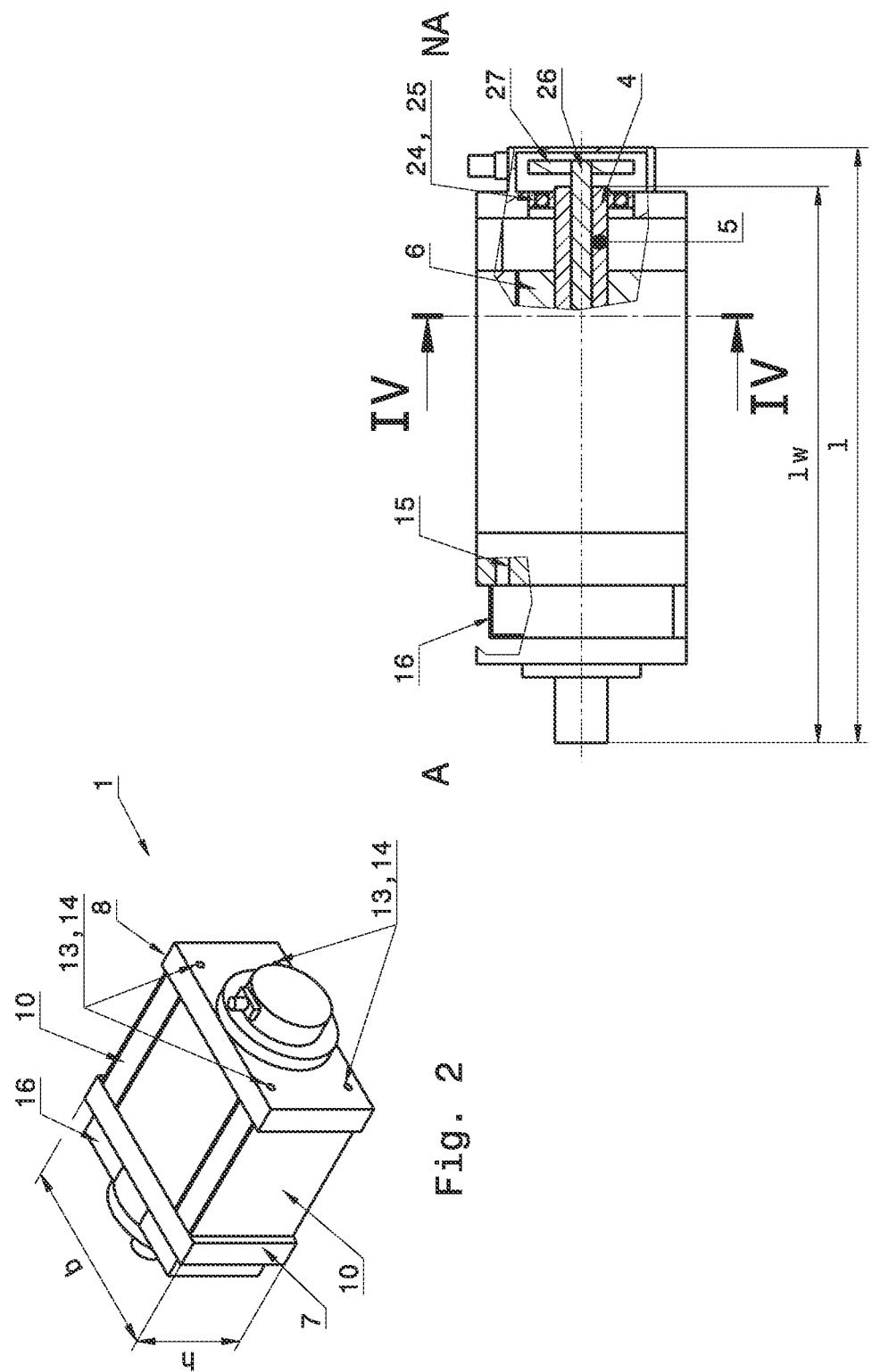

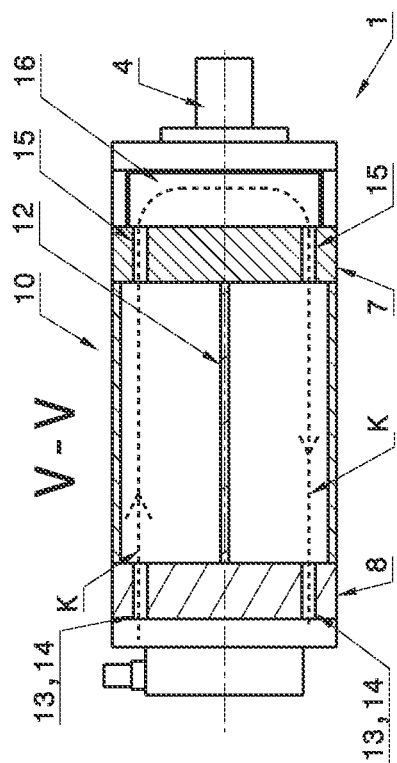
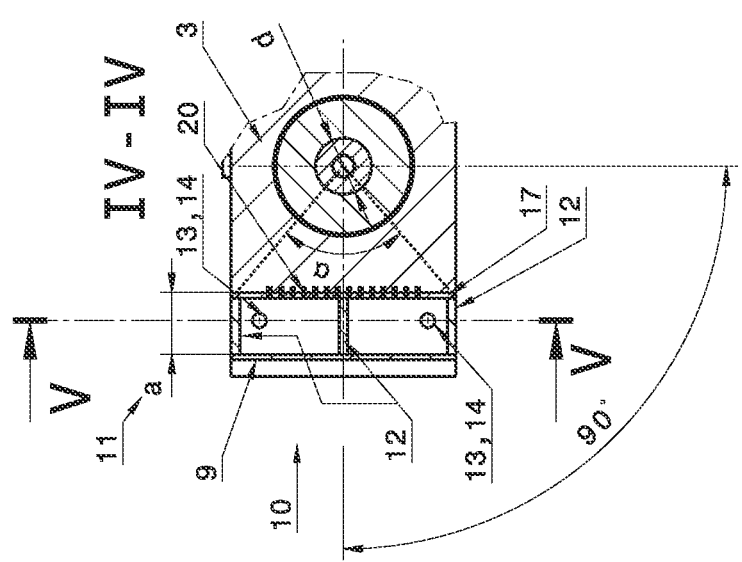

UNENCLOSED ELECTRIC TRACTION MACHINE

CROSS REFERENCE TO RELATED APPLICATIONS

This application is the National Stage of PCT/EP2020/068354 filed on Jun. 30, 2020, which claims priority under 35 U.S.C. § 119 of European Application No. 19200030.5 filed on Sep. 27, 2019, the disclosure of which is incorporated by reference. The international application under PCT article 21(2) was not published in English.

The invention relates to an unenclosed electric traction machine, with a stator built up from a stator laminated core, and a rotor shaft, with a rotor mounted on the latter, built up from a rotor laminated core, wherein the stator laminated core is arranged between two external pressing plates and at least one bearing shield, which in each case has a bearing for the rotor shaft.

The present invention relates to unenclosed traction machines, that is to say, electric drive motors, preferably for rail-based vehicles, such as trams or trains.

In particular in low-floor rail vehicles, which allow passengers to get on and off easily, there is very little space available for the bogie, the transmission, and the drive motors, due to the low level of the floor. In rail vehicles, individual wheels or wheel sets can in each case be driven by one motor. Accordingly, a bogie with four wheels usually comprises two or four drive motors. Since rail vehicles are usually designed for two directions of travel, the electric machines must be designed for both directions of rotation.

EP 0 548 044 B1, for example, describes a rail vehicle, the bogie of which is designed in particular for low-floor rail vehicles with a low floor height, and thus limited space for bogie, transmission and drive motors. Here the drive is preferably provided by wheel hub motors, which are accommodated directly under the wheel housings.

Low-floor rail vehicles of known art have, due to the larger build of the drive motors, transmission and bogies, areas with a higher floor height, that is to say, areas that are not available to passengers; this of course brings with it disadvantages for passenger transport, especially in urban areas.

In addition to the construction of electric machines, which should be designed to be as small as possible, but still as powerful as possible, their cooling poses a great challenge, as the routing of the cooling fluid and the dissipation of the heat loss must also be accommodated in the limited space available in the low-floor rail vehicle. Accordingly, parts of the cooling systems are often positioned on the roof of the rail vehicle.

CN 1 937 365 A, for example, describes a water-cooled, electric traction machine for the drive of a rail vehicle, which has a housing, and thus has a larger build than unenclosed electric machines.

The object of the present invention is therefore to create an aforementioned unenclosed electric traction machine, which is designed to be as space-saving as possible, but nevertheless as powerful as possible, so that in particular its application as a traction machine for low-floor rail vehicles is advantageous. The disadvantages of electric machines of known art are to be avoided, or at least reduced.

The object in accordance with the invention is achieved in that along a section of the periphery of the stator laminated core, and spaced apart from the stator laminated core, at least one cover, designed as a tension bar between the pressing plates, is arranged between the pressing plates so as to form at least one cooling box, with a base on the surface of the stator laminated core, wherein the at least one intermediate space between the base and the at least one cover of the cooling box is designed for the routing of a cooling fluid. The fact that a cover for purposes of forming a cooling box is only arranged along a section of the periphery of the stator laminated core results in a build of the unenclosed electric traction machine that has smaller dimensions in one dimension, for example in height, than in the other dimension, for example the width. Thus, an unenclosed electric traction machine can be implemented, which is particularly space-saving, and thus is particularly suitable for driving the rail wheels of a low-floor tram. Since the at least one cover for purposes of forming the at least one cooling box at the same time serves as a tension bar between the pressing plates, separate tension bars can be omitted without reducing the mechanical strength of the machine. Below the at least one cooling box, a base is arranged on the surface of the stator laminated core, which forms the connection to the surface of the underlying part of the stator laminated core. By this means, a best possible thermal conductivity is to be provided, for optimal dissipation of the heat loss of the stator laminated core by way of the cooling fluid. Thus, the inventive electric machine combines the properties of cooling and mechanical strength. The at least one cooling box is designed for the routing of a cooling fluid, that is to say, a cooling liquid or a cooling gas, so that the heat loss generated during operation of the electric machine can be dissipated rapidly, and any overheating of the electric machine can be effectively prevented. If a plurality of cooling boxes is provided, these can be supplied in series or in parallel with the cooling fluid. Any connecting lines between the cooling boxes for the cooling fluid can already be integrated into the design of the electric machine. A series connection of the cooling boxes can also be made across a plurality of electric motors. Due to the small build size of the electric machine and the low rotating mass of the rotor, particularly high rotational speeds, for example of more than 12,000 rpm, can be achieved. The electric machine is preferably designed as an asynchronous machine, or a synchronous machine excited by permanent magnets. In particular, the electric machine can be arranged in low-floor rail vehicles in such a way that the rotor shaft is arranged below the axis of rotation of the driven rail wheel. This is possible by virtue of the small size of the electric machine, and leads to improved spatial properties, and thus to the achievement of a lower floor height in the rail vehicle.

Two cooling boxes are advantageously arranged symmetrically with respect to each other, in each case over a circumferential angle of 60° to 135°, in each case preferably of essentially 90°. The arrangement of two cooling boxes over such a circumferential angle results in a particularly low build size for the electric machine. The symmetrical arrangement of two cooling boxes improves the cooling effect.

In the intermediate space of each cooling box, webs, and, in at least one pressing plate, at least one inlet and at least one outlet, can be arranged for the cooling fluid, for purposes of a meandering routing of the cooling fluid between the webs in the intermediate space. This measure, which can be implemented simply and cost-effectively, results in improved heat dissipation and thus optimum cooling of the electric machine, whereby high power densities can be achieved, despite the small build size.

Openings for the cooling fluid can be arranged in a pressing plate. By this means the region outside the pressing plate, where the heads of the stator winding are usually located, can also be cooled in a suitable manner by way of the cooling fluid.

Outside the pressing plate with the openings for the cooling fluid, a deflection device for the cooling fluid can be arranged. This deflection device can be formed by a type of cap that is connected, preferably welded, to the pressing plate. In this way, the cooling fluid from the cooling box is also directed into regions outside the pressing plate, and these regions are also cooled accordingly.

The base of the cooling box is preferably made of a material that can be processed appropriately for a materially bonded connection with the stator laminated core; for example it is suitable for welding or adhesive bonding, has good thermal conductivity, and meets the necessary mechanical requirements. The base can, for example, be made from structural steel.

The base is preferably connected to the stator laminated core by means of material bonding, at least at some places, so as to achieve an optimal thermal connection of the cooling box to the stator laminated core. Welding methods or adhesive methods are particularly suitable as connection methods.

Similarly, the base can also be connected by means of a form fit to the stator laminated core, at least at some places. In this variant of embodiment, the base is configured and processed in such a way that a type of form fit is achieved between the surface of the stator laminated core and the base in the course of manufacture. This can be done, for example, with the aid of a welded joint on the periphery of the base, or with a divided base. The form fit is here achieved by the thermal distortion caused by the heat input of an appropriately controlled welding process.

To improve the heat dissipation, the base can have openings. These openings can, for example, be in the form of elongated holes, but in principle can have any shape.

Alternatively, the base can also be designed without openings, and a heat conducting membrane can be arranged between the base and the surface of the stator laminated core. By this means it is possible to compensate for unevennesses and tolerances between the stator laminated core and the base, and to achieve better thermal contact between the cooling fluid in the cooling box and the stator of the electric machine. Here the base is preferably connected, in particular welded, laterally or over the entire periphery to the surface of the stator laminated core, and the heat conducting membrane is arranged in between. The heat conducting membrane consists of a material with appropriately good heat conduction, and the best possible shape adaptation, that is to say, it has a so-called "gap-filler" property. The heat conducting membranes can, for example, be made of an elastomeric foam, or a silicone membrane with glass fibre reinforcement.

The pressing plates are designed to be essentially rectangular. By this means the electric machine is particularly space-saving, and is especially suitable for use as a drive motor in low-floor rail vehicles.

The cooling fluid preferably takes the form of cooling water, which, if need be, is provided with suitable additives. Theoretically, cooling gases are also conceivable. The cooling fluid is routed to the cooling box or boxes of each electric machine by way of appropriate lines, and the heat generated in the electric machine is dissipated by way of heat exchangers, which can, for example, be arranged on the roof of a low-floor rail vehicle. The individual cooling boxes of a number of electric machines can be connected in series so as to achieve the shortest possible connection lines for the cooling fluid between the electric machines.

A coupling for connection to a transmission can be arranged on the drive side of the rotor shaft of the unenclosed electric traction machine. A curved-tooth coupling, for example, is particularly suitable for purposes of compensating for any relative movements between the electric machine and the transmission. Other forms of embodiment provide for electric machines with only one bearing station on the rotor shaft in the electric machine itself, and a second support in the transmission with the aid of a diaphragm coupling. Furthermore, the rotor shaft of the electric machine can be combined with the pinion shaft of a transmission in one component.

The at least one bearing for the support of the rotor shaft in the at least one bearing shield can take the form of an angular contact ball bearing. Ball bearings of this type, which are of known art per se, are particularly suitable for the support of the rotor shaft of the electric machine, as they have particularly good running properties in the upper rotational speed range.

If at least one heat pipe is arranged in the rotor laminated core, with a free end, or connected to a heat sink, the rotor of the electric machine can be additionally cooled. Such so-called "heat pipes" are metal vessels of elongated shape which contain a hermetically sealed volume, in which is contained a working medium, for example water or ammonia, which fills the volume to a small extent in the liquid state, and to a larger extent in the gaseous state. By using the evaporation heat of the medium, large quantities of heat can be transported over a small cross-sectional area. In this manner, the rotor can be cooled by way of the at least one heat pipe by transporting the heat to the free end of the heat pipe, where, if need be, it can be dissipated by a heat sink.

The height of the unenclosed electric traction machine preferably lies in a range between 60 mm and 300 mm, the width between 60 mm and 300 mm, and the length between 110 mm and 1,000 mm. Such dimensions are particularly suitable for the application of the electric machine as a drive motor for low-floor rail vehicles.

The rotor shaft preferably has a diameter of 20 mm to 100 mm, and a length between 100 mm and 980 mm. These dimensions are particularly suitable for a drive motor in rail vehicles, especially low-floor vehicles.

The present invention is explained in more detail with reference to the accompanying drawings. Here:

FIG. 2 shows a further view in perspective of an unenclosed electric traction machine in accordance with the invention;

FIG. 3 shows a partially sectioned side view of the unenclosed electric traction machine shown in FIG. 2;

FIG. 4 shows a section through the unenclosed electric traction machine shown in FIG. 3, along the section line IV-IV;

FIG. 5 shows a section through the unenclosed electric traction machine shown in FIG. 4, along the section line V-V;

Figure 1:
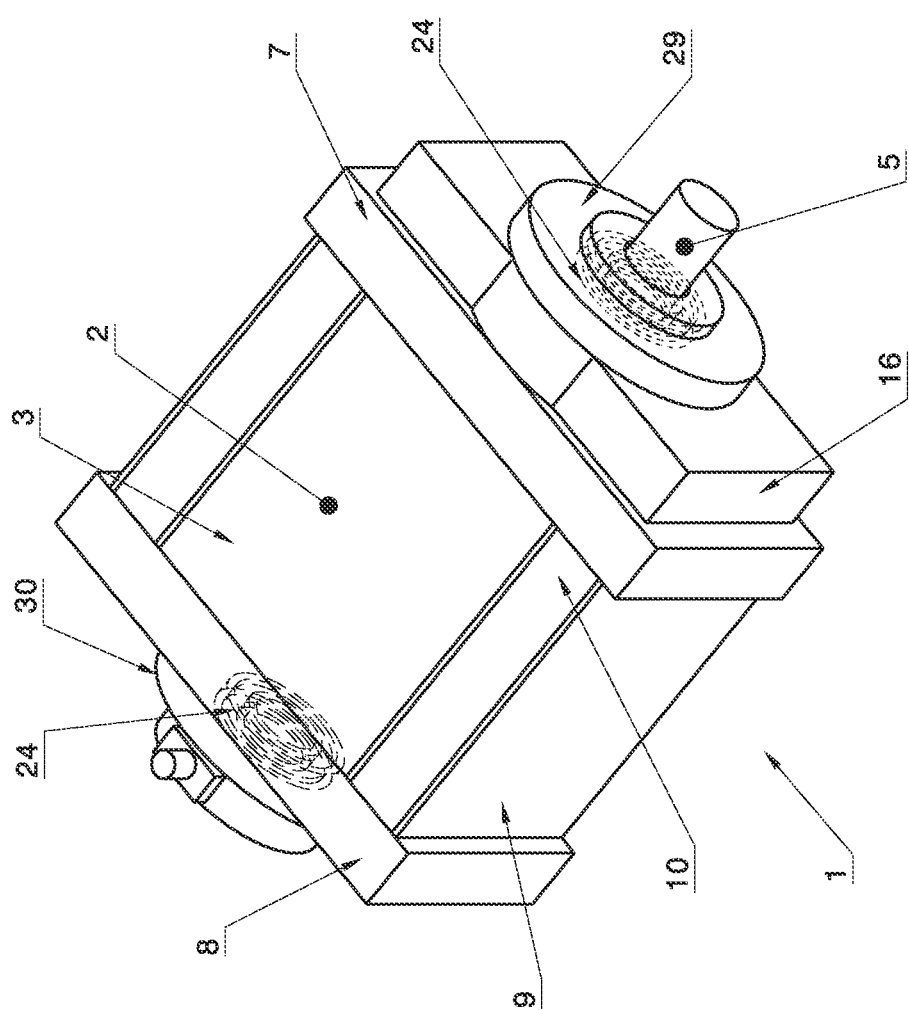
FIG. 1 shows in perspective a schematic illustration of an unenclosed electric traction machine in accordance with the invention.

FIG. 1 shows in perspective a schematic illustration of an unenclosed electric traction machine 1 in accordance with the invention. The electric traction machine 1, designed as an internal rotor motor, consists of a stator 2, which is built up from an appropriate stator laminated core 3, and a moving part, the rotor 5, which is built up from a rotor shaft 4, and a rotor laminated core 6, mounted on the latter. The stator laminated core 3 of the stator 2 is arranged between two outer pressing plates 7 and 8. Outside each of the pressing plates 7 and 8 is a bearing shield 29 and 30, having appropriate bearings 24 (indicated by dashed lines) for the support of the rotor shaft 4. The electric traction machine 1 may also contain only one bearing 24 in one bearing shield 29 or 30, and the second bearing for the rotor shaft 4 may be integrated into a coupling 21 or a transmission 22 (see FIG. 7).

In accordance with the invention, along a section of the periphery of the stator laminated core 3, and spaced apart from the stator laminated core 3 between the pressing plates 7 and 8, at least one cover 9, designed as a tension bar between the pressing plates 7 and 8, is arranged so as to form a cooling box 10. In the example of embodiment illustrated, two cooling boxes 10 are formed by two covers 9 designed as tension bars. A cooling fluid K can be routed within the intermediate space 11 between the stator laminated core 3 and the respective cover 9 of each cooling box 10, so as to be able to dissipate the heat generated in the electric traction machine 1.

FIG. 2 shows in perspective a further schematic illustration of an unenclosed electric traction machine 1 in accordance with the invention. In accordance with the invention, the result is an electric traction machine 1 that has a height h that is reduced in comparison with the width b. The cooling fluid K can be conveyed into the cooling box 10, and out of the cooling box 10, by way of appropriate inlets 13 and outlets 14 in the pressing plate 7 and/or 8. For example, an inlet 13 for the cooling fluid K is located in each cooling box 10, and an outlet 14 for the cooling fluid K is located in the pressing plate 7 or 8. Openings 15 for the cooling fluid K can be arranged in the opposite pressing plate 8 or 7, where the cooling fluid K is routed out of the cooling box 10 and is led back into the latter. Appropriate deflection devices 16 serve to provide the redirection of the cooling fluid K outside the pressing plate 8 or 7.

FIG. 3 shows a partially sectioned illustration of the unenclosed electric traction machine 1 shown in FIG. 2. Here is illustrated the rotor 5 of the electric traction machine 1, consisting of a rotor shaft 4 and a rotor laminated core 6. The cooling fluid K passes from the cooling box 10, by way of the opening 15, into the deflection device 16, where the cooling fluid K is routed back into the cooling box 10 by way of a further opening 15 (see also FIG. 5). A heat pipe 26 may be arranged in the rotor shaft 4, the free end of which may be connected to a heat sink 27. The length $l_w$ of the rotor shaft 4 can be between 100 mm and 980 mm. The length l of the entire electric machine can be, for example, between 110 mm and 1,000 mm. A rotary encoder (not shown) may be arranged on the non-drive side NA of the electric traction machine 1; this may be used to control the number of rotations. A toothed disc, which generates the signals for such an encoder, could be used as a heat sink 27 for the heat pipe 26.

FIG. 4 shows the section view through the unenclosed electric traction machine 1 shown in FIG. 3, along the section line IV-IV. This section view shows a cooling box 10 with the inlet 13, the outlet 14 and a web 12. Heat from the stator laminated core 3 and the base 17 is transferred to the cooling fluid K in the cooling box by way of a heat conducting membrane 20, and dissipated accordingly. The cover 9 for purposes of forming the cooling box 10 is at the same time designed as a tension bar between the pressing plates 7, 8 of the electric traction machine 1. In the example of embodiment illustrated, the cooling box 10 extends over a circumferential angle α of somewhat less than 90°. The distance a between the cover 9 and the stator laminated core 3 is preferably 6 mm to 60 mm. The diameter d of the rotor shaft 4 is, for example, 20 mm to 100 mm.

FIG. 5 shows the section view through the unenclosed electric traction machine 1 shown in FIG. 4, along the section line V-V. The cooling fluid K enters a sub-compartment of the cooling box 10 by way of the inlet 13, which sub-compartment is separated from the other sub-compartment by the web 12. By way of an opening 15 in the pressing plate 8, the cooling fluid K also enters the region outside the cooling box 10, so as to be able also to cool the winding heads there, for example. By way of a deflection device 16, which is designed in the form of a cap-like construction arranged on the pressing plate 8 and welded to the latter, the cooling fluid K is guided by way of a further opening 15 in the pressing plate 8 into the lower part of the cooling box 10, and is led out of the electric traction machine 1 by way of the outlet 14 in the pressing plate 7.

Figure 6A:
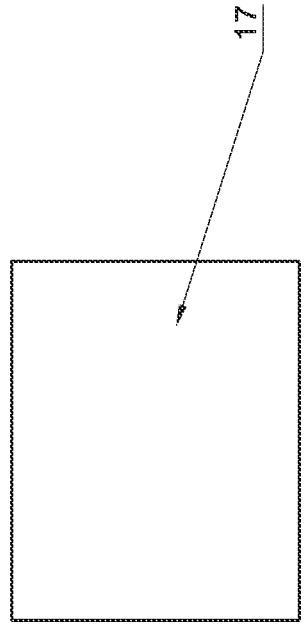
FIGS. 6a to 6c show in plan view and side view various shapes of bases for purposes of forming the cooling boxes.
Figure 6B:
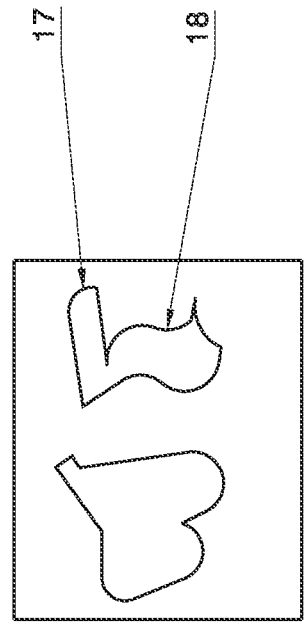
Figure 6C:
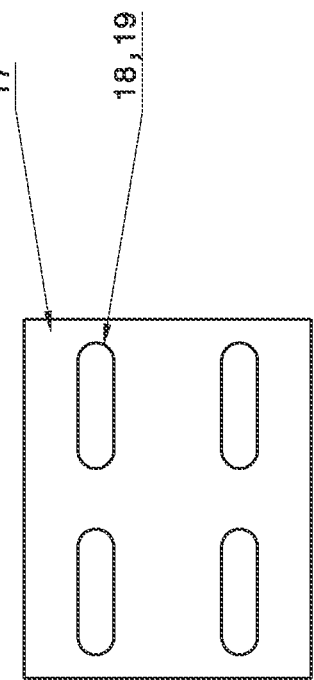

FIGS. 6a to 6c show in plan view and side view various shapes of bases 17 for purposes of forming the cooling boxes 10. FIGS. 6a, 6b and 6c show various forms of embodiment of a base 17, which is arranged on the upper side of the stator laminated core 3, and is connected to it, for example by means of material bonding, in particular by welding. In FIG. 6a, the base 17 has a solid surface design. In FIG. 6b, openings 18 of any shape are provided in the base 17. In the variant in FIG. 6c, openings 18 in the form of elongated holes 19 are located in the base 17. When connecting the base 17 to the surface of the stator laminated core 3, a material bond is created, preferably on the periphery of the base and on the periphery of the openings 18, or elongated holes 19. Instead of a material bond, the base 17 can also be at least partially connected by means of a form fit to the stator laminated core 3.

Figure 7:
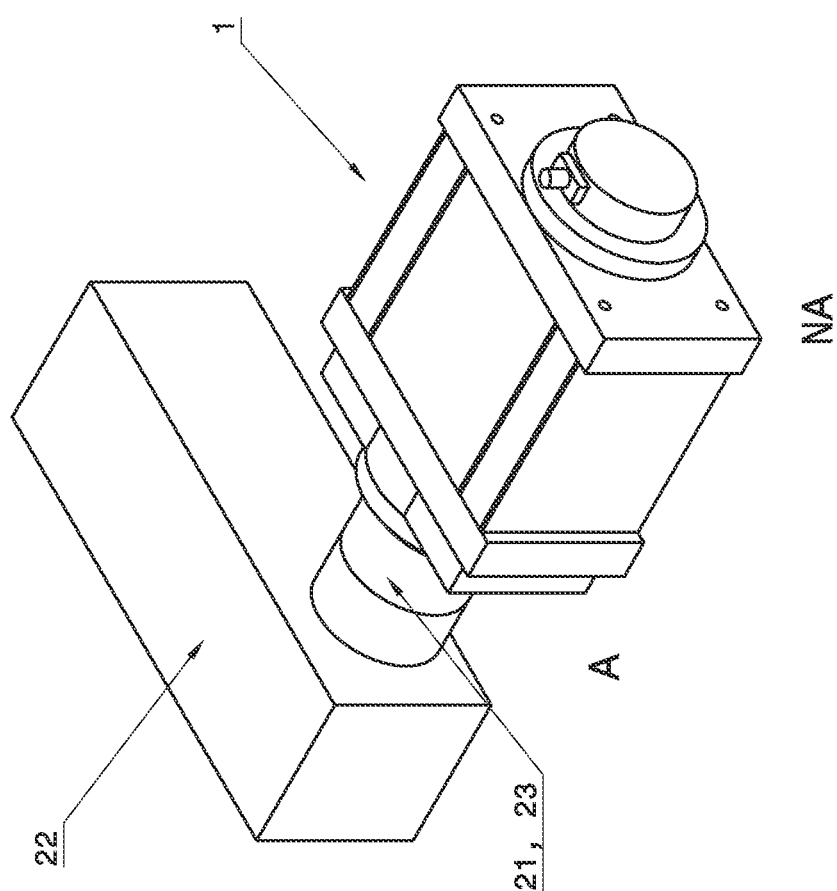
FIG. 7 shows in perspective a schematic illustration of an unenclosed electric traction machine connected to a transmission.

Finally, FIG. 7 shows in perspective a schematic illustration of an unenclosed electric traction machine 1 connected to a transmission 22. A coupling 21 can be provided on the drive side A of the rotor shaft 4, for connection to a transmission 22. The coupling 21 can, for example, be implemented in the form of a curved-tooth coupling 23.

The invention claimed is:

1. An unenclosed electric traction machine, with a stator built up from a stator laminated core, and a rotor shaft with a rotor, mounted on the latter, built up from a rotor laminated core, wherein the stator laminated core is arranged between two essentially rectangular outer pressing plates, and at least one bearing shield, which in each case has a bearing for the rotor shaft, wherein, along a section of the periphery of the stator laminated core, and spaced apart from the stator laminated core, at least one cover, designed as a tension bar between the pressing plates, is arranged between the pressing plates so as to form at least one cooling box, with a base on the surface of the stator laminated core, and wherein at least one intermediate space is disposed between the base and the at least one cover of the cooling box and the at least one intermediate space is designed for the routing of a cooling fluid.

2. The unenclosed electric traction machine according to claim 1 wherein two cooling boxes are arranged in each case over a circumferential angle (α) of 60° to 135°.

3. The unenclosed electric traction machine according to claim 2, wherein the two cooling boxes are arranged in each case over a circumferential angle ($\alpha$) of 90°.

4. The unenclosed electric traction machine according to claim 1 wherein webs are arranged in the intermediate space of each cooling box, and at least one inlet and at least one outlet for the cooling fluid are arranged in at least one pressing plate of the two pressing plates, for the meandering routing of the cooling fluid between the webs in the intermediate space.

5. The unenclosed electric traction machine according to claim 1, wherein openings for the cooling fluid are arranged in a pressing plate of the two pressing plates.

6. The unenclosed electric traction machine according to claim 5, wherein a deflection device for the cooling fluid is arranged outside the pressing plate with the openings for the cooling fluid.

7. The unenclosed electric traction machine according to claim 1, wherein the base is connected to the stator laminated core, at least at some places.

8. The unenclosed electric traction machine according to claim 7, wherein the base is welded to the stator laminated core, at least at some places.

9. The unenclosed electric traction machine according to claim 1, wherein the base is connected by means of a form fit to the stator laminated core, at least at some places.

10. The unenclosed electric traction machine according to claim 1, wherein the base has openings.

11. The unenclosed electric traction machine according to claim 10, wherein the openings are in the form of elongated holes.

12. The unenclosed electric traction machine according to claim 1, wherein a heat conducting membrane is arranged between the base and the stator laminated core.

13. The unenclosed electric traction machine according to claim 1, wherein the cooling fluid takes the form of cooling water.

14. The unenclosed electric traction machine according to claim 1, wherein a coupling for connection to a transmission is arranged on a drive side of the rotor shaft.

15. The unenclosed electric traction machine according to claim 14, wherein the coupling comprises a curved-tooth coupling.

16. The unenclosed electric traction machine according to claim 1, wherein the at least one bearing in the at least one bearing shield takes the form of an angular contact ball bearing.

17. The unenclosed electric traction machine according to claim 1, wherein at least one heat pipe, with a free end, or connected to a heat sink, is arranged in the rotor laminated core, for purposes of cooling the rotor.

18. The unenclosed electric traction machine according to claim 1, wherein the unenclosed traction machine is smaller in a first dimension than in a second dimension.

19. The unenclosed electric traction machine according to claim 18, wherein the first dimension is a height of the unenclosed traction machine and the second dimension is a width of the unenclosed traction machine.

* * * * *